United States Patent
Ryu et al.

(10) Patent No.: US 10,274,643 B2
(45) Date of Patent: Apr. 30, 2019

(54) PLASTIC POLARIZED LENS AND METHOD OF PRODUCING THE SAME

(71) Applicant: Mitsui Chemicals, Inc., Minato-ku, Tokyo (JP)

(72) Inventors: Akinori Ryu, Omuta (JP); Hiroyuki Kamio, Nagoya (JP); Yoshimitsu Aiiso, Sabae (JP)

(73) Assignee: MITSUI CHEMICALS, INC., Minato-Ku, Tokyo (JP)

( * ) Notice: Subject to any disclaimer, the term of this patent is extended or adjusted under 35 U.S.C. 154(b) by 248 days.

(21) Appl. No.: 14/719,902

(22) Filed: May 22, 2015

(65) Prior Publication Data
US 2015/0276986 A1  Oct. 1, 2015

Related U.S. Application Data

(62) Division of application No. 13/785,943, filed on Mar. 5, 2013, now abandoned.
(Continued)

(30) Foreign Application Priority Data

Mar. 6, 2012 (JP) ................................. 2012-049779
Jul. 19, 2012 (JP) ................................. 2012-160158

(51) Int. Cl.
*G02B 1/08* (2006.01)
*G02B 5/30* (2006.01)
(Continued)

(52) U.S. Cl.
CPC .......... *G02B 1/08* (2013.01); *B29D 11/00644* (2013.01); *G02B 1/043* (2013.01); *G02B 5/3033* (2013.01)

(58) Field of Classification Search
CPC ........ G02B 1/08; G02B 1/043; G02B 5/3033; B29D 11/00644
(Continued)

(56) References Cited

U.S. PATENT DOCUMENTS

| 2008/0036964 A1 | 2/2008 | Miura et al. |
| 2009/0201584 A1 | 8/2009 | Ryu et al. |
| 2013/0155507 A1 | 6/2013 | Ryu et al. |

FOREIGN PATENT DOCUMENTS

| CN | 101490601 A | 7/2009 |
| CN | 101910892 A | 12/2010 |

(Continued)

OTHER PUBLICATIONS

Office Action issued by the Japanese Patent Office in corresponding Japanese Patent Application No. 2016-095952 dated Mar. 28, 2017 (6 pages including partial English translation).
(Continued)

*Primary Examiner* — Wen Huang
(74) *Attorney, Agent, or Firm* — Buchanan, Ingersoll & Rooney PC

(57) ABSTRACT

A plastic polarized lens of the present invention, comprising: a polarized film containing thermoplastic polyester, a coat layer containing a urethane-based resin comprised of a structural unit derived from compound having hydroxyl group and a structural unit derived from aromatic diisocyanate, which is formed over at least one surface of the polarized film and a substrate layer containing a thiourethane-based resin, which is formed over at least the coat layer of the coat layer-attached polarized film.

16 Claims, 1 Drawing Sheet

Related U.S. Application Data

(60) Provisional application No. 61/607,279, filed on Mar. 6, 2012, provisional application No. 61/673,377, filed on Jul. 19, 2012.

(51) Int. Cl.
*G02B 1/04* (2006.01)
*B29D 11/00* (2006.01)

(58) Field of Classification Search
USPC ...................................................... 359/488.01
See application file for complete search history.

(56) References Cited

FOREIGN PATENT DOCUMENTS

| | | |
|---|---|---|
| JP | S63-141001 A | 6/1988 |
| JP | 9-258009 A | 10/1997 |
| JP | 2001-201602 A | 7/2001 |
| JP | 2008-179690 A | 8/2008 |
| WO | WO 02/073291 A1 | 9/2002 |
| WO | WO 2004/099859 A1 | 11/2004 |
| WO | WO 2008/018168 A1 | 2/2008 |
| WO | WO 2012/020570 A1 | 2/2012 |

OTHER PUBLICATIONS

Office Action issued in corresponding Chinese Application No. 2013800133327 dated Mar. 11, 2015 (15 pages).

PLASTIC POLARIZED LENS AND METHOD OF PRODUCING THE SAME

CROSS-REFERENCE TO RELATED APPLICATIONS

This application is a divisional of U.S. application Ser. No. 13/785,943, filed Mar. 5, 2013, which claims priority under 35 U.S.C. § 119 from U.S. Provisional Application No. 61/607,279, filed Mar. 6, 2012 and Provisional Application No. 61/673,377, filed Jul. 19, 2012. This application is based on Japanese Patent Application No. 2012-049779, filed Mar. 6, 2012, and No. 2012-160158, filed Jul. 19, 2012, the contents of which are incorporated hereinto by reference.

BACKGROUND

Technical Field

The present invention relates to a plastic polarized lens and a method of producing the same.

Related Art

A polarized lens can prevent transmission of reflected light. Therefore, it is used for protecting eyes by intercepting a strong reflected light in outdoor such as in a skiing ground or in fishing, and for securing safety in driving a car by intercepting a reflected light from a car running in the opposite direction.

For a plastic polarized lens, two kinds of polarized lens are proposed, namely, a polarized lens with a polarized film laid on the surface of the lens material, and a sandwich structured polarized lens with a polarized film within the lens. The polarized lens with a polarized film laid on the surface of the lens material (for example, Japanese Patent Application Laid-Open No. H09-258009 (Patent Document 1)) can make the thickness of the lens thin, but has a serious disadvantage that the polarized film is liable to be peeled off from the lens material during a periphery grinding process (a process of grinding periphery of the lens to fit in a predetermined shape).

A resin used for a polarized film composing a polarized lens has been essentially limited so far to polyvinyl alcohol. The polarized film is produced by a uniaxial extension of polyvinyl alcohol film after adding iodine or a dichroic dye to make a film having molecular orientation in uniaxial direction. A method of producing a polarized lens composed of a polarized polyvinyl alcohol film is disclosed, for example, in the WO 2004/099859 (Patent Document 2)).

However, the polarized lens produced by using a polarized polyvinyl alcohol film has shortcomings of gradual penetration of water from the rim of the lens and causing deterioration from the periphery to the center of the lens with time or due to the surrounding environment.

In order to improve above-mentioned shortcomings, WO 02/073291 (Patent Document 3) proposed a polarized lens using a lens material containing impact-resistant polyurethane resin obtained from diamine and isocyanate-prepolymer, and a polarized film containing polyethylene terephthalate.

However, this polarized lens has a disadvantage that the polarized film contained in the lens is clearly visible from outside which gives an uncomfortable feeling to a person who wears the eyeglasses containing this lens. Furthermore, as the composition of the mixture of diamine and isocyanate prepolymer has a high viscosity and a short pot life, injection of the composition to a lens mold with a fixed polarized film therein is troublesome, and production of a thin lens was particularly difficult.

WO 2008/018168 (Patent Document 4) proposed a plastic polarized lens in which a layer containing a thiourethane-based resin obtained by reacting an isocyanate compound with an active hydrogen compound is stacked on both surfaces of a polarized film containing thermoplastic polyester.

However, this polarized lens needed to be improved in terms of peeling of the polarized film caused in the periphery grinding process.

Therefore, in the conventional plastic polarized lens, there has been a demand for a plastic polarized lens having reduced occurrence of peeling-off of the polarized film during a periphery grinding process of the lens as a downstream process and excellent water-resistance, giving less uncomfortable feeling on wearing, and is capable of producing a thin product.

PRIOR ART DOCUMENT

Patent Document

[Patent Document 1] Japanese Unexamined Patent Application Publication No. H9-258009
[Patent Document 2] WO 2004/099859
[Patent Document 3] WO 02/073291
[Patent Document 4] WO 2008/018168

SUMMARY

In addition, for industrially manufacturing a large amount of polarized lenses, there is a demand for a polarized lens which can be industrially manufactured with excellent yield by inhibiting peeling of a polarized lens caused when the periphery of a polymerized lens is grinded with an edger or the like, and exhibits excellent adhesion between a polarized film and a plastic lens.

The present invention has been made to address the above problems in the conventional art, has an object to provide a plastic polarized lens with excellent processability and showing excellent adhesion between a polarized lens and a plastic lens, and a method of producing the same.

[1] A plastic polarized lens, comprising: a polarized film containing thermoplastic polyester, a coat layer containing a urethane-based resin comprised of a structural unit derived from compound having hydroxyl group and a structural unit derived from aromatic diisocyanate, which is formed over at least one surface of the polarized film and a substrate layer containing a thiourethane-based resin, which is formed over at least the coat layer of the coat layer-attached polarized film.

[2] The plastic polarized lens according to [1], wherein, the compound having hydroxyl group is a trimethylolpropane and the aromatic diisocyanate is a tolylene diisocyanate.

[3] The plastic polarized lens according to [2], wherein the coat layer further contains a silane coupling agent.

[4] The plastic polarized lens according to [1], wherein, the compound having hydroxyl group is a polybutadiene having hydroxyl group on the terminal and the aromatic diisocyanate is a diphenylmethane diisocyanate.

[5] The plastic polarized lens according to any one of [1] to [4], wherein the coat layer and the substrate layer are stacked in order over both surfaces of the polarized film.

[6] The plastic polarized lens according to any one of [1] to [5], wherein the thiourethane-based resin is obtained by reacting isocyanate compound(s) (A) with active hydrogen compound(s) (B) and wherein the isocyanate compound(s)

(A) is at least one selected from a group consisting of a polyisocyanate compound, an isocyanate compound having an isothiocyanate group and a polyisothiocyanate, and the active hydrogen compound(s) (B) is at least one selected from a group consisting of a thiol compound having a hydroxyl group and a polythiol compound.

[7] The plastic polarized lens according to any one of [1] to [6], wherein the polarized film is shaped under a condition of a temperature T represented by the following formula, $$\text{glass transition temperature of thermoplastic polyester}+5°\,C. \leq T \leq \text{melting point of thermoplastic polyester.} \quad \text{(Formula)}$$

[8] The plastic polarized lens according to any one of [1] to [7], wherein the polarized film is a polyethylene terephthalate film.

[9] The plastic polarized lens according to any one of [6] to [8], wherein the isocyanate compound(s) (A) is at least one of diisocyanate compounds selected from a group consisting of m-xylylene diisocyanate, 2,4-tolylene diisocyanate, 2,6-tolylene diisocyanate, 4,4'-diphenylmethane diisocyanate, 2,5-bis(isocyanatomethyl)-bicyclo[2.2.1]-heptane, 2,6-bis(isocyanatomethyl)-bicyclo[2.2.1]-heptane, bis(4-isocyanatocyclohexyl)methane, 1,3-bis(isocyanatomethyl)cyclohexane, 1,4-bis(isocyanatomethyl)cyclohexane, and hexamethylene diisocyanate, and the active hydrogen compound(s) (B) is at least one of polythiol compounds selected from a group consisting of pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-dimercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[10] The plastic polarized lens according to [2] or [3], wherein a refractive index at e-line of the thiourethane-based resin is in a range of 1.50 to 1.70.

[11] A method of producing a plastic polarized lens, comprising: forming a coat layer containing a urethane-based resin comprised of a structural unit derived from compound having hydroxyl group and a structural unit derived from aromatic diisocyanate, over at least one surface of a polarized film containing thermoplastic polyester; fixing the coat layer-attached polarized film into a lens casting mold, in a state separated from an inner surface of the mold; injecting a monomer mixture into a gap between at least the coat layer of the coat layer-attached polarized film and the inner surface of the mold; and stacking a substrate layer containing a thiourethane-based resin over at least the coat layer of the coat layer-attached polarized film by polymerizing and curing the monomer mixture.

[12] The method of producing a plastic polarized lens according to [11], wherein, the compound having hydroxyl group is a trimethylolpropane and the aromatic diisocyanate is a tolylene diisocyanate.

[13] The method of producing a plastic polarized lens according to [12], wherein the coat layer further contains a silane coupling agent.

[14] The method of producing a plastic polarized lens according to [11], wherein the compound having hydroxyl group is a polybutadiene having hydroxyl group on the terminal and the aromatic diisocyanate is a diphenylmethane diisocyanate.

[15] The method of producing a plastic polarized lens according to any one of [11] to [14], wherein the forming a coat layer includes forming the coat layer over both surfaces of the polarized film.

[16] The method of producing a plastic polarized lens according to any one of [11] to [15], further comprising: shaping the polarized film under a condition of a temperature equal to or higher than a glass transition temperature of thermoplastic polyester +5° C. and equal to or lower than a melting point of thermoplastic polyester, before the forming a coat layer.

[17] The method of producing a plastic polarized lens according to [12] or [13], further comprising: a step of shaping the polarized film under a condition of a temperature equal to or higher than a glass transition temperature of thermoplastic polyester +5° C. and equal to or lower than a melting point of thermoplastic polyester, after the forming a coat layer.

[18] The method of producing a plastic polarized lens according to [12], [13] or [17], wherein, in the injecting a monomer mixture, a viscosity at 20° C. of the monomer mixture is not more than 200 mPa·s.

[19] A urethane-based resin-coated polarized film comprising: a polarized film containing thermoplastic polyester and a coat layer containing a urethane-based resin comprised of a structural unit derived from compound having hydroxyl group and a structural unit derived from aromatic diisocyanate, which is formed over at least one surface of the polarized film.

[20] The urethane-based resin-coated polarized film according to [19], wherein, the compound having hydroxyl group is a trimethylolpropane and the aromatic diisocyanate is a tolylene diisocyanate.

[21] The urethane-based resin-coated polarized film according to [20], wherein the coat layer further contains a silane coupling agent.

[22] The urethane-based resin-coated polarized film according to [19], wherein, the compound having hydroxyl group is a polybutadiene having a hydroxyl group on the terminal and the aromatic diisocyanate is a diphenylmethane diisocyanate.

[23] A method of producing a urethane-based resin-coated polarized film, comprising: forming a coat layer containing a urethane-based resin comprised of a structural unit derived from compound having hydroxyl group and a structural unit derived from aromatic diisocyanate, over at least one surface of a polarized film containing thermoplastic polyester.

[24] The method of producing a urethane-based resin-coated polarized film according to [23], wherein, the compound having hydroxyl group is a trimethylolpropane and the aromatic diisocyanate is a tolylene diisocyanate.

[25] The method of producing a urethane-based resin-coated polarized film according to [24], wherein the coat layer further contains a silane coupling agent.

[26] The method of producing a urethane-based resin-coated polarized film according to [23], wherein, the compound having hydroxyl group is a polybutadiene having a hydroxyl group on the terminal and the aromatic diisocyanate is a diphenylmethane diisocyanate.

The plastic polarized lens of the present invention has excellent processability and exhibits excellent adhesion between a polarized film and a plastic lens. Accordingly, the plastic polarized lens of the present invention has excellent productivity and is suitable for mass production. The plastic polarized lens having such characteristics is particularly useful as a polarized lens for eyeglasses.

BRIEF DESCRIPTION OF THE DRAWINGS

The above and other objects, advantages and features of the present invention will be more apparent from the following description taken in conjunction with the accompanying drawings, in which.

DETAILED DESCRIPTION

Figure 1:
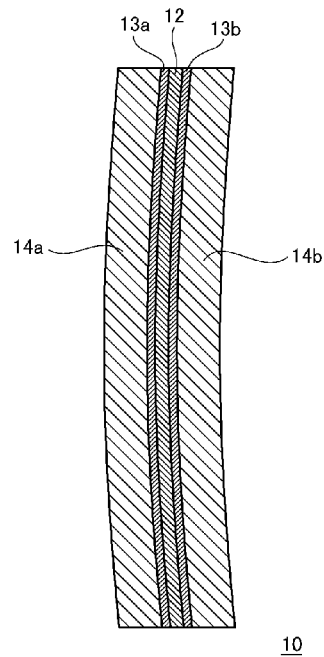
FIG. 1 shows a cross-sectional view schematically showing a plastic polarized lens according to an embodiment.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A plastic polarized lens of the present invention is comprised of a polarized film containing thermoplastic polyester, a coat layer containing a urethane-based resin comprised of a structural unit derived from compound having hydroxyl group and a structural unit derived from aromatic diisocyanate, which is formed over at least one surface of the polarized film, and a substrate layer containing a thiourethane-based resin, which is formed over at least the coat layer of the coat layer-attached polarized film.

Hereinafter, a first embodiment and a second embodiment of a plastic polarized lens in the present invention will be described using drawings. Moreover, in all drawings, the same constituent elements will be marked with the same reference numerals so as not to repeat the description thereof.

First Embodiment

[Plastic Polarized Lens]

As shown in FIG. 1, a plastic polarized lens 10 of the present embodiment is comprised a polarized film 12 containing thermoplastic polyester; coat layers 13a and 13b containing urethane-based resin which are formed over both surfaces of the polarized film 12; and substrate layers 14a and 14b containing a thiourethane-based resin which are formed over both surfaces of the coat layer-attached polarized film.

In the present embodiment, "a urethane-based resin comprised of a structural unit derived from trimethylolpropane and a structural unit derived from tolylene diisocyanate" is used as "a urethane-based resin comprised of a structural unit derived from compound having hydroxyl group and a structural unit derived from aromatic diisocyanate".

A urethane-based resin containing a structural unit derived from compound having three hydroxyl groups or more has a cross-linked structure. Accordingly, in general, it is considered that a coat layer containing this urethane-based resin is not preferable from the view of adhesion between it and a material to be coated.

However, the present inventors have seriously studied and found that the urethane-based resin containing a structural unit derived from compound having three hydroxyl groups or more has excellent adhesion property, and found that processing characteristics and adhesion property are improved by using a structural unit derived from tolylene diisocyanate in combination. As the result, the present inventors have completed the plastic polarized lens of the present embodiment.

In the plastic polarized lens of the present embodiment, a coat layer containing a urethane-based resin and a substrate layer containing a thiourethane-based resin are stacked in order over at least one surface of the polarized film 12 containing thermoplastic polyester. Accordingly, water resistance becomes excellent, uncomfortable feeling is inhibited on wearing, the thickness thereof becomes thin, and peeling of the polarized film caused in a periphery grinding process as a post-process is inhibited. That is, these properties are balanced well.

In addition, as the polarized film 12, a film containing thermoplastic polyester that is shaped under a condition of a temperature T represented by the following formula can be used.

glass transition temperature of thermoplastic polyester+5° C.≤$T$≤melting point of thermoplastic polyester                    (Formula)

When the polarized film 12 is shaped (curved) into a shape having a desired curvature under such a temperature condition, adhesion between the film and the substrate layer is further improved. Accordingly, the plastic polarized lens of the present embodiment has superior productivity and is suitable for mass production.

[Method of Producing Plastic Polarized Lens]

Hereinafter, the method of producing a plastic polarized lens will be described with reference to drawings.

The method of producing a plastic polarized lens of the present embodiment includes the following steps.

(a) A step of forming the coat layers 13a and 13b containing a urethane-based resin comprised of a structural unit derived from a trimethylolpropane and a structural unit derived from tolylene diisocyanate, over both surfaces of the polarized film 12 containing thermoplastic polyester (b) A step of fixing the coat layer-attached polarized film 12 into a lens casting mold, in a state separated from an inner surface of the mold (c) A step of injecting a monomer mixture into a gap between both surfaces of the coat layer-attached polarized film 12 and the inner surface of the mold (d) A step of stacking the substrate layers 14a and 14b containing a thiourethane-based resin over both surfaces of the coat layer-attached polarized film 12 by polymerizing and curing the monomer mixture Hereinafter, the respective steps will be described in order.

(Step (a))

The polarized film containing a thermoplastic polyester of the present embodiment is disclosed, for example, in Japanese Laid-open patent publication No. 2002-267841. Specifically, it is a polarized film having a matrix of a thermoplastic polyester. The polarized film may be obtained by blending a dye in the thermoplastic polyester, molding it to a film, followed by uniaxial extension of the film obtained by molding, and subsequent heat treatment at a prescribed temperature. The thickness is normally in the range of 10 to 500 μm.

Specifically, as the thermoplastic polyester constituting the polarized film 12, polyethylene terephthalate, polyethylene naphthalate, polybutylene terephthalate, and the like can be used. In view of water resistance, heat resistance, and molding processability, polyethylene terephthalate is preferable. The polyethylene terephthalate also includes those modified by a technique of adding copolymerizable components.

It is preferable to use a dichroic dye as the dye used in the present embodiment, and known dyes are used as the dichroic dye. The dyes are disclosed in, for example, Japanese Unexamined Patent Application Publication No. S61-087757, Japanese Unexamined Patent Application Publication No. S61-285259, Japanese Unexamined Patent Application Publication No. 562-270664, Japanese Unexamined Patent Application Publication No. S62-275163, Japanese Unexamined Patent Application Publication No. H01-103667, and the like. Specific examples of the dye include anthraquinone-based dye, quinophthalone-based dye, azo-based dye, and the like. Among these, dyes having heat resistance that tolerate molding of thermoplastic polyester are preferable.

In addition, before the step (a) of forming the coat layers 13a and 13b, a step of shaping the polarized film 12 under a condition of a temperature equal to or higher than a glass transition temperature of thermoplastic polyester +5° C. and equal to or lower than a melting point of thermoplastic polyester may be performed. Alternatively, the shaping step may be performed after the coat layers are formed (after the step (a)).

The thermoplastic polyester film can be shaped preferably in a condition of a temperature equal to or higher than a glass transition temperature of thermoplastic polyester +5° C. and equal to or lower than a glass transition temperature of thermoplastic polyester +100° C., more preferably in a condition of a temperature equal to or higher than a glass transition temperature of thermoplastic polyester +5° C. and equal to or lower than a glass transition temperature of thermoplastic polyester +80° C., and particularly preferably in a condition of a temperature equal to or higher than a glass transition temperature of thermoplastic polyester +5° C. and equal to or lower than a glass transition temperature of thermoplastic polyester +70° C. As a method of shaping the thermoplastic polyester film, a common method can be used as long as the method makes it possible to shape the film into a shape having a desired curvature while heating the film at the above temperature.

At the above shaping temperature, adhesion between the polarized film 12 containing thermoplastic polyester and the substrate layers 14a and 14b containing a thiourethane-based resin is further improved.

When the thermoplastic polyester is, for example, polyethylene terephthalate, a glass transition temperature thereof is 74° C., and a melting point thereof is 259° C. Accordingly, shaping can be performed under a condition of a temperature from 79° C. to 259° C., preferably from 79° C. to 174° C., more preferably from 79° C. to 154° C., and particularly preferably from 79° C. to 144° C.

The glass transition temperature of the thermoplastic polyester can be measured using DSC (Differential Scanning calorimetry) in general.

As the forming method, there are vacuum forming, pressure forming, vacuum-pressure forming, press forming and the like. In these forming methods, by adjusting the temperature of the thermoplastic polyester film to enter the above-mentioned temperature range, and by forming it into a desired curvature shape, the adhesiveness between the polarized film comprised of the thermoplastic polyester film and the plastic lens can be improved.

In the method of shaping the thermoplastic polyester film, conditions such as a molding pressure and molding time are appropriately adjusted according to the shaping method, the temperature at the time of shaping, a production instrument, and the like. Moreover, before being shaped in a mold or the like, the thermoplastic polyester film may be heated such that the temperature thereof falls within the above temperature range.

In the step (a), urethane coating is performed on the surface of the polarized film 12 so as to form a urethane resin-containing coat layer.

In the present embodiment, when urethane coating is performed on the polarized film 12, a solvent-free urethane-based coating agent may be coated as is. However, generally, it is preferable to coat a coating solution prepared by dissolving or dispersing the coating agent in an appropriate solvent selected.

The solvent can be selected from alcohol compounds such as methanol, ethanol, and isopropanol, aromatic compounds such as toluene and xylene, ester compounds such as ethyl acetate, ketone compounds such as acetone, methyl ethyl ketone, and methyl isobutyl ketone, halogen compounds such as dichloromethane, and the like. One kind of the solvent can be used alone, or two or more kinds thereof can be used concurrently.

The concentration of the above coating solution expressed in terms of a urethane-based resin is 0.1 wt % to 50 wt %, preferably 1 wt % to 50 wt %, and even more preferably 3 wt % to 30 wt %. If the concentration exceeds 50 wt %, stability of the coating solution over time becomes poor, the presence of a coating layer becomes noticeable since the amount of a urethane resin coated increases and the coating layer becomes too thick, and the adhesion deteriorates due to peeling caused inside the coating layer, in some cases. Inversely, if the concentration is lower than 0.1 wt %, the effect of improving adhesion between the film and the urethane resin as a substrate is not obtained sufficiently in some cases.

The thickness of the coating layer is 0.001 μm to 30 μm, preferably 0.01 μm to 10 μm, and more preferably 0.05 μm to 5 μm.

After the coating solution is optionally coated onto both surfaces of the polarized film 12 of the present embodiment, a part of the coating solution having fluidity is optionally removed from the film, followed by drying. The drying temperature is not particularly limited, but an appropriate temperature range is generally 5° C. to 100° C., preferably 20° C. to 100° C., more preferably 20° C. to 80° C., and particularly preferably 20° C. to 60° C. It is also possible to apply heat stepwise by combining the above temperature.

The drying time is set appropriately according to the solvent used or the environment such as drying time or air blowing state and is not particularly limited. Generally, the drying time is 1 minute or longer.

Although, in the present embodiment, there is no particular limit on the method of coating of the coating solution on both surfaces of the polarized film 12 containing thermoplastic polyester, it is largely classified into a method of treating the polarized film with a coating agent containing urethane-based resin and then forming a curvature, a method of treating with a coating agent containing urethane-based resin after forming a curvature, or a method of employing both of above methods in combination. Any of the above methods may be employed, and depending on each condition, conventionally known methods such as a roll-coating method, a spin-coating method, a spray-coating method, a bar-coating method, a dipping method and the like may be used. After drying, the coating can be performed once or more, and the coating solution used for each time may be the same or of different kinds. Typically, the object of the present embodiment can be achieved by one-time coating and drying without repeated coating.

After coating the polarized film with the urethane-based resin used for the above-mentioned primer coating treatment, drying and/or heat treatment are performed as necessary. As long as the applied temperature of the drying and/or heat treatment does not actually deteriorate the function of the polarized film, there is no particular limit. After coating the resin on the polarized film, an active energy line may be irradiated on it. As the active energy line, there is an ultraviolet ray or an electron beam.

The urethane-based resin used for the coating treatment is a polymer comprised of a structural unit derived from trimethylolpropane and a structural unit derived from tolylene diisocyanate. The coating solution may further contain a silane coupling agent.

Examples of the silane coupling agent include silane coupling agents having one or more substituents among an epoxy group, an amino group, a (meth)acryloyl group, a vinyl group, a mercapto group, a halogen group, an imino group, an isocyanate group, and a ureido group. Examples of a hydrolysable group binding to a silicon atom of the silane coupling agent include an alkoxy group which may have two or more oxygen atoms, an alkyl carboxyl group, a halogen group, and the like. Among these, an alkoxysilane compound having an alkoxy group which may have two or more oxygen atoms is more preferable.

Specific examples thereof include silane coupling agents having an epoxy group, such as γ-glycidoxypropyl trimethoxysilane, γ-glycidoxypropyl methyl diethoxysilane, β-(3,4-epoxycyclohexyl)ethyl trimethoxysilane, and γ-glycidoxypropyl methyl diethoxysilane; silane coupling agents having an amino group, such as γ-aminopropyl trimethoxysilane, γ-aminopropyl triethoxysilane, N-β-(aminoethyl)-γ-aminopropyl trimethoxysilane, N-β-(aminoethyl)-γ-aminopropyl methyl dimethoxysilane, N-phenyl-γ-aminopropyl trimethoxysilane, bis[3-(trimethoxysilyl)propyl]amine, and bis[3-(trimethoxysilyl)propyl]ethylene diamine, or silane coupling agents including hydrochloride thereof; silane coupling agents having a (meth)acryloxy group, such as γ-methacryloxypropyl trimethoxysilane, γ-methacryloxypropyl methyl dimethoxysilane, γ-methacryloxypropyl triethoxysilane, γ-methacryloxypropyl methyl diethoxysilane, γ-methacryloxypropyl tris(methoxyethoxy)silane, and γ-acryloxypropyl trimethoxysilane; silane coupling agents having a vinyl group, such as vinyl trimethoxysilane, vinyl triethoxysilane, vinyl trichlorosilane, vinyl tris(β-methoxyethoxy)silane, styryl ethyl trimethoxysilane, allyl triethoxysilane, and 3-(trimethoxysilyl)propyl methacrylate; silane coupling agents having a mercapto group, such as γ-mercaptopropyl trimethoxysilane, γ-mercaptopropyl methyl dimethoxysilane, and γ-mercaptopropyl triethoxysilane; silane coupling agents having a halogen group, such as γ-chloropropyl trimethoxysilane and γ-chloropropyl triethoxysilane; silane coupling agents having an isocyanate group, such as γ-isocyanatepropyl trimethoxysilane and γ-isocyanatepropyl triethoxysilane; silane coupling agents having a ureido group, such as γ-(ureidopropyl)trimethoxysilane and γ-(ureidopropyl)triethoxysilane; and the like.

Among these, examples of preferable silane coupling agents include γ-glycidoxypropyl trimethoxysilane, γ-aminopropyl trimethoxysilane, N-β-(aminoethyl)-γ-aminopropyl methyl dimethoxysilane, N-phenyl-γ-aminopropyl trimethoxysilane, γ-methacryloxypropyl trimethoxysilane, γ-methacryloxypropyl methyl dimethoxysilane, γ-methacryloxypropyl triethoxysilane, γ-methacryloxypropyl methyl diethoxysilane, γ-methacryloxypropyl tris(methoxyethoxy)silane, γ-acryloxypropyltrimethoxysilane, vinyl trimethoxysilane, vinyl triethoxysilane, vinyl tris(β-methoxyethoxy)silane, γ-mercaptopropyl trimethoxysilane, γ-isocyanatepropyl trimethoxysilane, and the like. Particularly, (meth)acryloxyalkyl alkoxysilane such as γ-methacryloxypropyl trimethoxysilane, γ-methacryloxypropyl methyl dimethoxysilane, γ-methacryloxypropyl triethoxysilane, γ-methacryloxypropyl methyl diethoxysilane, γ-methacryloxypropyl tris(methoxyethoxy)silane, γ-acryloxypropyl trimethoxysilane, vinyl trichlorosilane are preferable.

These may be used alone, or two or more kinds thereof may be used concurrently. In addition, a case where a chemical reaction is caused between different types of silane coupling agents is also included.

Before coating treatment with the urethane-based resin on the polarized film 12 surface, at least one kind of pretreatments selected from those such as treatment with chemicals such as gas or chemical solution, treatment with corona discharge, treatment with plasma, treatment with ultra violet irradiation, treatment with electron beam irradiation, treatment with surface roughening, and treatment with burning may be performed on the polarized film 12 in advance.

Specific examples of the chemical treatment include gas treatment using gas such as ozone, halogen gas, and chlorine dioxide, and a chemical solution treatment using an oxidant or a reductant such as sodium hypochlorite, alkali metal hydroxide, alkali earth metal hydroxide, metal sodium, sulfuric acid or nitric acid, or using an acid or a base. In the chemical solution treatment, an oxidant, a reductant, an acid or a base, or the like is generally dissolved in water, alcohol, aqueous ammonia, or the like so as to be used in the form of a solution.

When the chemical used for the treatment is alkali metal hydroxide and/or alkali earth metal hydroxide, examples of the alkali metal hydroxide include lithium hydroxide, sodium hydroxide, potassium hydroxide and the like, and examples of the alkali earth metal hydroxide include magnesium hydroxide, calcium hydroxide, barium hydroxide, and the like. One or two or more kinds of these can be selected and used. Among these, sodium hydroxide and potassium hydroxide are preferable, and sodium hydroxide is particularly preferable.

The alkali metal hydroxide and/or alkali earth metal hydroxide are (is) preferably used in the form of a solution. Examples of solvents of the solution include water and/or organic solvents, and examples of the organic solvent include methanol, ethanol, isopropanol, and the like.

The concentration of the solution is in a range of 5% by weight to 55% by weight, and preferably in a range of 10% by weight to 45% by weight. The temperature of the solution is in a range of 0° C. to 95° C., preferably in a range of 20° C. to 90° C., and more preferably in a range of 30° C. to 80° C.

The pretreatment by alkaline metal hydroxides and/or alkaline earth metal hydroxides with respect to the present embodiment can be performed by bringing into contact the solution, which is within the above-mentioned solution concentration and temperature range, with one side or both sides of the polarized film for a predetermined period of time. As the method of contact, there are no particular limits, and for example, a method of immersing of the polarized film into the solution, or contacting with the polarized film by showering or surface-flowing can be suggested. Among them, the method of immersing the polarized film into the solution is preferable. During this time, in order to uniformize the concentration and the temperature of the solution, methods such as stirring, convection current flowing, and jet flowing can be adopted. Although there is no particular limit on the time period of contact, it should be within a time period range of 1 minute to 24 hours, preferably 5 minutes to 10 hours, and more preferably 5 minutes to 5 hours.

When the solution of the alkali metal hydroxide and/or alkali earth metal hydroxide is brought into contact with the polarized film, physical stimulation such as ultrasonic irradiation or vibration can be used concurrently.

In order to improve the wetting of the polarized film with the solution, the alkaline metal hydroxides and/or alkaline earth metal hydroxides may contain anionic, nonionic surfactants and the like.

During the contact between the alkaline metal hydroxides and/or alkaline earth metal hydroxides with the polarized film, the solution concentration, the solution temperature and the contact time period can be selected suitably within a range that the optical characteristics of the polarized film does not actually deteriorate.

After a solution of alkaline metal hydroxides and/or alkaline earth metal hydroxides is brought in contact with the polarized film, the polarized film is pulled out of the solution, and when necessary, the cleaning and drying of the polarized film may be performed with water and/or organic solvents such as methanol, ethanol, isopropanol, acetone, methylethyl ketone.

The corona discharge treatment mentioned above is a kind of gas discharge, in which the gas molecules ionize to exhibit conductivity and uses the phenomenon in which the film surface is activated by the ions, which is a surface treatment technique employed widely. As the gas of discharge treatment, there is air, but the gas may be nitrogen gas, carbon dioxide gas, ammonia gas and the like. The corona discharge treatment can be achieved, for example, by a method of treating the polarized film surface using the corona generated by supplying voltage to electrodes of a known high frequency generation apparatus. The corona discharge treatment strength should be preferably 1 to 500 W·min/m$^2$, and more preferably 5 to 400 W·min/m$^2$.

Examples of the plasma treatment mentioned above are a normal pressure plasma treatment and a vacuum plasma treatment (low temperature plasma treatment).

In the normal pressure plasma treatment, discharge treatment is performed within a single or mixed gas atmosphere of gas such as air, water vapor, argon, nitrogen, helium, carbon dioxide, carbon monoxide and the like.

The vacuum plasma treatment can be performed within a reduced pressure, for example, by placing the polarized film inside a discharge treatment apparatus of an internal electrode type which has counter electrodes composed of a drum-shaped electrode and plural rod-shaped electrodes, and under a treatment gas atmosphere of 0.001 to 50 Torr, preferably 0.01 to 10 Torr, and more preferably 0.02 to 1 Torr, a high voltage of direct current or alternating current is supplied between the electrodes and discharged, generating plasma of the treatment gas, exposing the polarized film surface thereto. Although the treatment conditions of the vacuum plasma treatment depends on the treatment apparatus, the type of treatment gas, the pressure, the frequency of the power source and the like, the preferable conditions may be set suitably. As the treatment gas, for example, argon, nitrogen, helium, carbon dioxide, carbon monoxide, air, water vapor and the like may be used singularly or in mixture.

By the above step (a), a urethane-based resin-coated polarized film can be obtained.

(Step (b))

Figure 2:
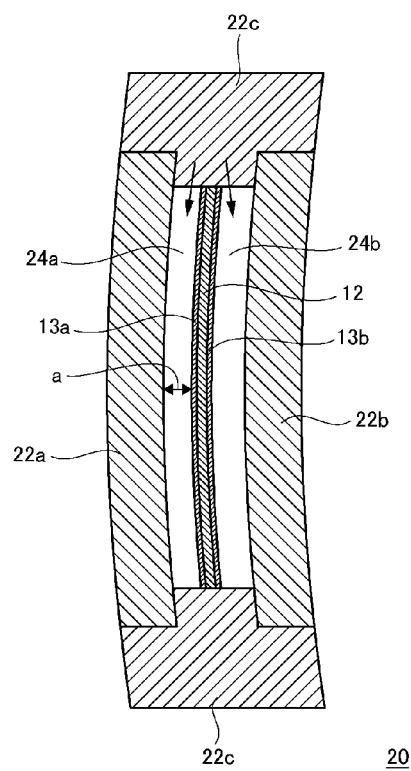
FIG. 2 shows a cross-sectional view schematically showing a lens casting mold according to an embodiment.

As shown in FIG. 2, the plastic polarized lens of the present embodiment is obtained by injecting a polymerizable composition containing a specific isocyanate compound and a specific active hydrogen compound into a lens casting mold 20 into which the polarized film 12 containing thermoplastic polyester and provided with the urethane-based coat layers 13a and 13b is fixed, followed by polymerizing and curing.

Generally, the lens casting mold 20 is constituted with two molds 22a and 22b held by a gasket 22c.

Examples of the material of the gasket 22c include polyvinyl chloride, an ethylene-vinyl acetate copolymer, an ethylene-ethyl acrylate copolymer, an ethylene-propylene copolymer, an ethylene-propylene-diene copolymer, a polyurethane elastomer, fluororubber, or soft elastic resins obtained by blending these with polypropylene. Among these, materials that do not swell or are not eluted for the polymerizable composition containing a specific isocyanate compound and a specific active hydrogen compound that is used in the present embodiment are preferable.

Examples of the material of the molds 22a and 22b include glass, metals, and the like, and glass is generally used. In order to improve releasing properties of the obtained lens, the molds 22a and 22b may be coated with a release agent in advance. Moreover, in order to impart hard coat performance to the lens material, the mold may be coated with a coat liquid in advance.

In the space of the lens casting mold 20, the polarized film 12 containing thermoplastic polyester is installed so that the film surface is parallel to the inner surface of the front side mold 22a which it faces. Between the polarized film 12 and the molds 22a and 22b, gaps 24a and 24b are formed respectively. A distance "a" that indicates the narrowest space of the gaps 24a and 24b is about 0.2 mm to 2.0 mm.

(Step (c))

Next, in the space of the lens casting mold 20, a monomer mixture (polymerizable composition) is injected into the two gaps 24a and 24b between the molds 22a and 22b and the polarized film 12, by a predetermined injection unit. In the present embodiment, a polymerizable composition containing the (A) isocyanate compound and the (B) active hydrogen compound having a thiol group can be used. In the present embodiment, a polymerizable composition containing the (A) isocyanate compound and the (B) active hydrogen compound having a thiol group can be used. Accordingly, viscosity at the time of injection is low, and the composition can be easily injected even into the gaps having the space described above.

The (A) isocyanate compound used in the present embodiment includes compounds having an isothiocyanate group, and is specifically one or two or more kinds of compounds selected from a polyisocyanate compound, an isocyanate compound having an isothiocyanate group, and a polyisothiocyanate compound.

Examples of the polyisocyanate compound include aliphatic polyisocyanate compounds such as hexamethylene diisocyanate, 2,2,4-trimethylhexane diisocyanate, 2,4,4-trimethyl hexamethylene diisocyanate, lysine diisocyanatomethyl ester, lysine triisocyanate, m-xylylene diisocyanate, α,α,α',α'-tetramethyl xylylene diisocyanate, bis(isocyanatomethyl)naphthalene, mesitylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, and bis(isocyanatomethylthio)ethane; alicyclic polyisocyanate compounds such as isophorone diisocyanate, bis(isocyanatomethyl)cyclohexane, dicyclohexyl methane diisocyanate, cyclohexane diisocyanate, methyl cyclohexane diisocyanate, dicyclohexyldimethyl methane isocyanate, 2,5-bis(isocyanatomethyl)-bicyclo[2.2.1]-heptane, 2,6-bis(isocyanatomethyl)-bicyclo[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, bis(4-isocyanatocyclohexyl)methane, 1,3-bis(isocyanatomethyl)cyclohexane, and 1,4-bis(isocyanatomethyl)cyclohexane; aromatic polyisocyanate compounds such as 2,4-tolylene diisocyanate, 2,6-tolylene diisocyanate, 4,4'-diphenylmethane diisocyanate, and diphenyl sulfide-4,4-diisocyanate; heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane; and the like, but the present embodiment is not limited to these example compounds.

Examples of the isocyanate compound having an isothiocyanate group include compounds obtained by changing a portion of the isocyanate groups of the polyisocyanate compounds exemplified above into an isothiocyanate group, but the present embodiment is not limited to these.

Examples of the polyisothiocyanate compound include aliphatic polyisothiocyanate compounds such as hexamethylene diisothiocyanate, lysine diisothiocyanatomethyl ester, lysine triisothiocyanate, m-xylylene diisothiocyanate, bis(isothiocyanatomethyl)sulfide, bis(isothiocyanatoethyl)sulfide, and bis(isothiocyanatoethyl)disulfide; alicyclic polyisothiocyanate compounds such as isophorone diisothiocyanate, bis(isothiocyanatomethyl)cyclohexane, dicyclohexyl methane diisothiocyanate, cyclohexane diisothiocyanate, methyl cyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, and 4,9-bis(isothiocyanatomethyl)tricyclodecane; aromatic polyisothiocyanate compounds such as diphenyl disulfide-4,4-diisothiocyanate; sulfur-containing heterocyclic polyisothiocyanate compounds such as 2,5-diisothiocyanatothiophene, 2,5-bis(isothiocyanatomethyl)thiophene, 2,5-diisocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane; and the like, but the present embodiment is not limited to these example compounds.

In addition, it is possible to use these isocyanate compounds substituted with halogen, such as chlorine-substituted isocyanate compounds and bromine-substituted isocyanate compounds, alkyl-substituted isocyanate compounds, alkoxy-substituted isocyanate compounds, nitro-substituted isocyanate compounds, prepolymer type modified isocyanate compounds combined with polyol, carbodiimide-modified isocyanate compounds, urea-modified isocyanate compounds, biuret-modified isocyanate compounds, products of a dimerization or trimerization reaction, and the like. These isocyanate compounds can be used alone, or two or more kinds thereof can be used by being mixed with each other.

As the isocyanate compound (A), diisocyanate compounds are preferably used, in view of easy availability, price, and the performance of the obtained resin. For example, m-xylylene diisocyanate, 2,4-tolylene diisocyanate, 2,6-tolylene diisocyanate, 4,4'-diphenyl methane diisocyanate, 2,5-bis(isocyanatomethyl)-bicyclo[2.2.1]-heptane, 2,6-bis(isocyanatomethyl)-bicyclo[2.2.1]-heptane, bis(4-isocyanatocyclohexyl)methane, 1,3-bis(isocyanatomethyl)cyclohexane, 1,4-bis(isocyanatomethyl)cyclohexane, and hexamethylene diisocyanate are preferably used, and 2,5-bis(isocyanatomethyl)-bicyclo[2.2.1]-heptane, 2,6-bis(isocyanatomethyl)-bicyclo[2.2.1]-heptane, and m-xylylene diisocyanate are particularly preferably used. One kind of these can be used, or two or more kinds of these can be used in combination.

The (B) active hydrogen compound used in the present embodiment is one or two or more kinds of active hydrogen compounds selected from a thiol compound having a hydroxy group and a polythiol compound.

Examples of the thiol compound having a hydroxy group include 2-mercaptoethanol, 3-mercapto-1,2-propanediol, glycerin bis(mercaptoacetate), 4-mercaptophenol, 2,3-dimercapto-1-propanol, pentaerythritol tris(3-mercaptopropionate), and pentaerythritol tris(thioglycolate), and the like, but the present embodiment is not limited to these example compounds.

Examples of the polythiol compound include aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, thioglycolic acid of these and ester of mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethylether bis(2-mercaptoacetate), 2-mercaptoethylether bis(3-mercaptopropionate), thiodiglycolic acid bis(2-mercaptoethylester), thiodipropionic acid bis(2-mercaptoethylester), dithiodiglycolic acid bis(2-mercaptoethylester), dithiodipropionic acid bis(2-mercaptoethylester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, and tris(mercaptoethylthio)methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethylenoxy)benzene, 1,3,5-tris(mercaptoethylenoxy)benzene, 2,5-toluenedithiol, 3,4-toluenedithiol, 1,5-naphthalenedithiol, and 2,6-naphthalenedithiol; heterocyclic polythiol compounds such as 2-methylamino-4,6-dithiol-sym-triazine, 3,4-thiophenedithiol, bismuththiol, 4,6-bis(mercaptomethylthio)-1,3-dithiane, and 2-(2,2-bis(mercaptomethylthio)ethyl)-1,3-dithiane; and the like, but the present embodiment is not limited to these example compounds.

In addition, oligomers of these active hydrogen compounds and the active hydrogen compounds substituted with halogen, such as chlorine-substituted active hydrogen compounds or bromine-substituted active hydrogen compounds may be used. These active hydrogen compounds can be used alone, or two or more kinds thereof can be used be being mixed with each other.

Among these active hydrogen compounds, polythiol compounds are preferably used, in view of easy availability, price, and the performance the obtained resin. For example, pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-dimercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithiane are preferably used, and pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane are particularly preferably used. One kinds of these can be used, or two or more kinds thereof can be used in combination.

Moreover, the (A) isocyanate compound used in the present embodiment may be preliminarily reacted with a portion of the (B) active hydrogen compound. Furthermore, the (B) active hydrogen compound used in the present embodiment may be preliminarily reacted with a portion of the (A) isocyanate compound.

In addition to the (A) isocyanate compound and (B) active hydrogen compound, in order to modify the resin, a resin modifier such as a hydroxy compound, an epoxy compound, an episulfide compound, an organic acid and its anhydride, an olefin compound including (meth) acrylate compound or the like may be added. Herein, the resin modifier is a compound which adjusts or improves physical properties such as refractive index, Abbe's number, heat resistance, specific gravity, and mechanical strength such as impact strength of thiourethane-based resin.

Examples of the hydroxy compound used as the resin modifier include diethylene glycol, triethylene glycol, dipropylene glycol, tripropylene glycol, 1,4-butanediol, thiodiethanol, dithiodiethanol, glycerin, trimethylolpropane, pentaerythritol, and oligomers of these, but the present embodiment is not limited to these example compounds.

Examples of the epoxy compound that can be added as the resin modifier include phenol-based epoxy compounds obtained by a condensation reaction between a polyphenol compound such as bisphenol A glycidyl ether and an epihalohydrin compound; alcohol-based epoxy compounds obtained by the condensation between a polyol compound such as hydrogenated bisphenol A glycidyl ether and an epihalohydrin compound; glycidyl ester-based epoxy compounds obtained by the condensation between a polyvalent organic acid compound such as 3,4-epoxycyclohexylmethyl-3',4'-epoxycyclohexane carboxylate and an epihalohydrin compound; amino-based epoxy compounds obtained by the condensation between primary and secondary diamine compounds and an epihalohydrin compound; aliphatic polyvalent epoxy compounds such as vinylcyclohexene diepoxide; and the like, but the present embodiment is not limited to these example compounds.

Examples of the episulfide compound that can be added as the resin modifier include chain-like aliphatic 2,3-epithiopropylthio compounds such as bis(2,3-epithiopropylthio)sulfide, bis(2,3-epithiopropylthio)disulfide, bis(2,3-epithiopropylthio)methane, 1,2-bis(2,3-epithiopropylthio)ethane, and 1,5-bis(2,3-epithiopropylthio)-3-thiapentane; cyclic aliphatic 2,3-epithiopropylthio compounds having a heterocycle, such as 1,3-bis(2,3-epithiopropylthio)cyclohexane and 2,5-bis(2,3-epithiopropylthiomethyl)-1,4-dithiane; aromatic 2,3-epithiopropylthio compounds such as 1,3-bis(2,3-epithiopropylthio)benzene and 1,4-bis(2,3-epithiopropylthio)benzene; and the like, but the present embodiment is not limited to these example compounds.

Examples of the organic acid and anhydride thereof that can be added as the resin modifier include thiodiglycolic acid, thiodipropionic acid, dithiodipropionic acid, phthalic anhydride, hexahydrophthalic anhydride, methyl hexahydrophthalic anhydride, methyl tetrahydrophthalic anhydride, maleic anhydride, trimellitic anhydride, pyromellitic anhydride, and the like, but the present embodiment is not limited to these example compounds.

Examples of the olefin compound that can be added as the resin modifier include (meth)acrylate compounds such as benzyl acrylate, benzyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, neopentyl glycol diacrylate, neopentyl glycol dimethacryalte, ethylene glycol bisglycidyl acrylate, ethylene glycol bisglycidyl methacrylate, bisphenol A diacrylate, bisphenol A dimethacrylate, bisphenol F diacrylate, bisphenol F dimethacryalte, trimethylopropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, xylylene dithiol diacrylate, xylylene dithiol dimethacrylate, mercaptoethyl sulfide diacrylate, and mercaptoethyl sulfide dimethacrylate; allyl compounds such as allyl glycidyl ether, diallyl phthalate, diallyl terephthalate, diallyl isophthalate, and diethylene glycol bisallyl carbonate; vinyl compounds such as styrene, chlorostyrene, methyl styrene, bromostyrene, dibromostyrene, divinyl benzene, and 3,9-divinylspiro-bi(m-dioxane); and the like, but the present embodiment is not limited to these example compounds.

These resin modifiers can be used alone, or two or more kinds thereof can be used by being mixed with each other.

The ratio between the (A) isocyanate compound and (B) active hydrogen compound (also including the hydroxy compound as a modifier) used in the present embodiment is generally in a range of 0.8 to 1.5 and preferably in a range of 0.9 to 1.2, in terms of the molar ratio between functional groups of (NCO+NCS)/(SH+OH).

The (A) isocyanate compound and the (B) active hydrogen compound employed in the present embodiment are selected after considering the availability, cost, handleability, performance of the obtainable resin and the like.

The important factor in the convenience of handling is the viscosity of the polymerizable composition during injection. The viscosity during injection is decided by the combination of the (A) isocyanate compound and the (B) active hydrogen compound (When employing the resin modifier, this includes the type and amount of the resin modifier. Furthermore, when employing a catalyst, this includes the type and amount of the catalyst), but when the viscosity is too high, the production of the polarized lens becomes very difficult since it is very difficult to inject into the narrow spaces 24a and 24b located between the glass molds 22a and 22b and the polarized film 12 inside the space of the lens casting mold 20. Typically, the viscosity during injection should be preferably a measurement of 200 mPa·s or less at 20° C., and for producing a lens with very thin central thickness, an even lower viscosity of, for example, 100 mPa·s or less is preferable. The viscosity of the polymerizable composition is measured by using a B type viscometer at a solution temperature of 20° C.

A refractive index is considered to be an important performance of the resin, and a resin having a high refractive index can be preferably used. For example, a combination (including the type and amount of a resin modifier when the resin modifier is used) of the (A) isocyanate compound and (B) active hydrogen compound that can produce a resin having a refractive index generally in a range of 1.50 to 1.70, preferably in a range of 1.57 to 1.70, more preferably in a range of 1.59 to 1.70, and even more preferably in a range of 1.65 to 1.68 is preferable. If the refractive index is too low, the film put in the polarized lens is clearly noticeable, so the exterior of the lens becomes poor.

The same type of the polymerizable composition of the (A) isocyanate compound and (B) active hydrogen compound used in the present embodiment is applied to both surfaces of the polarized film in general. However, different types of the compositions may also be used.

When curing and forming the mixture of the (A) isocyanate compound and the (B) active hydrogen compound, as in the known forming method, materials such as catalysts such as dibutyl tin dichloride and the like, ultraviolet ray absorbing agents such as benzotriazole-based agents, internal mold releasing agents such as acidic phosphate ester and the like, photostabilizers, antioxidants, reaction initiators such as radical reaction initiator and the like, chain elongators, cross-linking agents, anticoloring agents, oil-soluble dyes, fillers and the like may be added as necessary.

When producing an injection solution by mixing a reaction catalyst, mold releasing agents or other additives to the (A) isocyanate compound and the (B) active hydrogen compound, the adding of the catalyst, the mold releasing agents and other additives are dependent on the solubility of the (A) isocyanate compound and the (B) active hydrogen compound, but the additives may be added and dissolved in the (A) isocyanate compound in advance, added and dissolved in the (B) active hydrogen compound in advance, or added and dissolved in the polymerizable composition containing the (A) isocyanate compound and the (B) active hydrogen compound. In addition, there is no problem in dissolving it in a part of the (A) isocyanate compound or the (B) active hydrogen compound to produce a master solution and then adding it to the mixture. The adding order is not limited by the exemplary methods, and is suitably selected on the basis of operability, safety and convenience.

Mixing is generally performed at a temperature not higher than 30° C. In view of pot life of the polymerizable composition, it is preferable to further reduce the temperature in some cases. Moreover, when the solubility of the additive such as a catalyst or a release agent is not excellent in the (A) isocyanate compound or (B) active hydrogen compound, sometimes the additive is warmed in advance and then dissolved in the (A) isocyanate compound, (B) active hydrogen compound, or a mixture of these.

Further, depending on the physical properties required for the plastic lens to be obtained, it is preferable to optionally perform degassing treatment under reduced pressure or filtering treatment under increased or reduced pressure in many cases.

(Step (d))

Subsequently, the lens casting mold, into which the polymerizable composition of the (A) isocyanate compound and (B) active hydrogen compound has been injected and the polarized film has been fixed, is heated for several hours or several tens of hours by a predetermined temperature program in a device that can perform heating, such as an oven, or in water, thereby performing curing molding.

The temperature of polymerization curing is not limited since the condition varies with the makeup of the polymerizable composition, the type of catalyst, the mold shape, and the like. However, the polymerization curing is performed for 1 hour to 100 hours at about −50° C. to 200° C.

Generally, the curing starts from a temperature in a range of 5° C. to 40° C., then the temperature is slowly raised to a range of 80° C. to 130° C., and heating is performed for 1 hour to 4 hours at this temperature.

After the curing molding ends, the resultant is taken out of the lens casting mold hereby the plastic polarized lens of the present embodiment as shown in FIG. 1 can be obtained. In this plastic polarized lens 10, the coat layer 13a and the substrate layer 14a are stacked in order over one surface of the polarized film 12, and the coat layer 13b and the substrate layer 14b are stacked in order over the other surface thereof. With this constitution, it is possible to prevent the polarized film 12 from being peeled from the lens material during the periphery grinding process, whereby a large amount of polarized lens can be produced industrially.

In the plastic polarized lens of the present embodiment, it is preferable to heat the released lens for an annealing treatment in order to lessen the distortion caused by the polymerization. The annealing temperature is generally in a range of 80° C. to 150° C., preferably in a range of 100° C. to 130° C., and more preferably in a range of 110° C. to 130° C. The annealing time is generally in a range of 0.5 hours to 5 hours and preferably in a range of 1 hour to 4 hours.

The plastic polarized lens of the present embodiment is used having coated layer(s) formed on one surface or both surfaces as necessary. As the coated layers, there are primer layers, hard coated layers, antireflection film layers, antifog coated layers, antipollutant layers, water-repellent layers and the like. These coated layers can be each employed singularly, or they may be employed as multi-layers with plural coated layers. When forming the coated layers on both surfaces, the same coated layer may be formed on each surface, or different coated layers may be formed thereon.

Along with these coated layers, ultraviolet ray absorbing agents for protecting the lens or the eyes from ultraviolet rays, infrared absorbing agents for protecting the eyes from infrared rays, photostabilizers or antioxidants for improving the weathering resistance of the lens, dye or pigment for improving the fashionability of the lens, and photochromic dyes or photochromic pigments, antistatic agents, and other known additives for improving the performance of the lens may be co-opted. Various leveling agents may be employed for improving the coating characteristic.

The primer layer is generally formed between the polarized lens substrate (thiourethane-based resin) and the hard coat layer so as to improve the adhesion of the hard coat layer or the impact resistance of the polarized lens, and the film thickness thereof is generally about 0.1 µm to 10 µm.

The primer layer is, for example, formed by a coating method or a dry method. In the coating method, the primer composition is coated by a coating method such as spin coating, dip coating and the like, and then it is solidified to form a primer layer. In the dry method, it is formed by a known dry method such as the CVD method or a vacuum plating method. When forming the primer layer, a preprocessing of the lens surface such as alkali treatment, plasma treatment, ultraviolet ray treatment and the like in order to improve the adhesiveness may be performed as necessary.

As the primer composition, materials which enable high adhesiveness between the solidified primer layer and the lens material (thiourethane-based resin) are preferred, and typically, primer compositions having urethane-based resins, epoxy-based resins, polyester-based resins, melanin-based resins, and polyvinylacetals as main ingredients are employed. The primer composition can be employed without a solvent, but it may employ appropriate solvents which do not affect the lens in order to adjust the viscosity of the composition and the like.

The hard coated layer is a coated layer which aims to provide functions such as abrasion resistance, wear resistance, moisture resistance, hot water resistance, heat resistance, weathering resistance and the like, and its layer thickness is typically 0.3 to 30 µm.

The hard coated layer is typically formed by curing after coating the hard coating composition by the known coating methods such as a spin coating method, dip coating method and the like. As the curing method, there are heat curing methods and curing methods by irradiation of energy lines such as ultraviolet rays, visible light and the like. When forming the hard coated layer, a preprocessing of the coating surface (the lens material or the primer layer) such as alkali treatment, plasma treatment, ultraviolet ray treatment and the like in order to improve the adhesiveness may be performed as necessary.

As hard coating compositions, the mixture of organic silicone compounds having curability and fine oxide particles (including complex fine oxide particles) of Si, Al, Sn, Sb, Ta, Ce, La, Fe, Zn, W, Zr, In, Ti and the like are frequently employed. Besides these, amines, amino acids, metal acetylacetonate complexes, organic acid metal salts, perchloric acids, salts of perchloric acids, acids, metal chlorides, multifunctional epoxy compounds and the like may be employed. The hard coating composition can be employed without a solvent, but it may be employed with appropriate solvents which do not affect the lens.

The antireflection layer is typically formed on the hard coated layer as necessary. The antireflection layer may be inorganic-based or organic-based. Generally, the inorganic-based antireflection layer is frequently formed by dry methods such as vacuum plating method, sputtering method, ion plating method, ion beam assisting method, CVD method and the like, which employ inorganic oxides such as $SiO_2$, $TiO_2$ and the like. Generally, the organic-based antireflection layer is frequently formed by a wet method which employs organic silicone compounds and compositions including silica-based fine particles having internal cavities.

The antireflection layer may be a single layered or multi-layered, but when employed as a single layer, it is preferable for its refractive index to be lower than the refractive index of the hard coated layer by 0.1 or more. The multi-layered antirefractive layer is preferable in order to effectively realize the antireflection function, and in this case, a low refractive index layer and a high refractive index layer are typically stacked alternatively. In this case, it is also preferable that the refractive index difference between the low refractive index layer and the high refractive index layer be 0.1 or more. As the high refractive index layer, there are, for example, ZnO, $TiO_2$, $CeO_2$, $Sb_2O_5$, $SnO_2$, $ZrO_2$, $Ta_2O_5$ and the like, and as for the low refractive index layer, there is $SiO_2$ and the like. The thickness of the layer is typically 50 to 150 nm.

Furthermore, in the plastic polarized lens of the present embodiment, rear side polishing, antistatic treatment, dye treatment, light modulation treatment and the like may be performed as necessary.

This plastic polarized lens is useful as polarized lenses of eyeglasses, and in particular, as the lens for correcting visual acuity due to the fact that thin-shaping is possible.

The plastic polarized lens and the method of producing the same of the present embodiment have been described as above, but the present embodiment also includes the following embodiment.

The plastic polarized lens of the present embodiment also includes an embodiment in which the coat layer 13a (or 13b) and the substrate layer 14a (or 14b) are stacked only over one surface of the polarized film 12. In this case, the substrate layer may be formed over the other surface (without the coat layer) of the polarized film 12.

The method of producing a plastic polarized lens of the present embodiment also employs an embodiment including the following steps.

(a) A step of forming a coat layer containing a urethane-based resin comprised of a structural unit derived from trimethylolpropane and a structural unit derived from tolylene diisocyanate, over one surface of a polarized film containing thermoplastic polyester (b) A step of fixing the coat layer-attached polarized film into a lens casting mold, in a state separated from an inner surface of the mold (c) A step of injecting a monomer mixture into a gap between the coat layer of the coat layer-attached polarized film and the inner surface of the mold (d) A step of stacking a substrate layer containing a thiourethane-based resin over the coat layer of the coat layer-attached polarized film by polymerizing and curing the monomer mixture.

(a) A step of forming a coat layer containing a urethane-based resin comprised of a structural unit derived from trimethylolpropane and a structural unit derived from tolylene diisocyanate, over one surface of a polarized film containing thermoplastic polyester (b) A step of fixing the coat layer-attached polarized film into a lens casting mold, in a state separated from an inner surface of the mold (c) A step of injecting a monomer mixture into a gap between the coat layer of the coat layer-attached polarized film and the inner surface of the mold and a gap between the polarized film and the inner surface of the mold (d) A step of stacking a substrate layer containing a thiourethane-based resin over both surfaces of the coat layer-attached polarized film by polymerizing and curing the monomer mixture Moreover, in the present embodiment, after the coat layer-attached polarized film is formed, a substrate film containing a thiourethane-based resin that is prepared in advance is stacked over the surface of the coat layer, whereby a plastic polarized lens can be produced.

Second Embodiment

[Plastic Polarized Lens]

A plastic polarized lens of the present embodiment has the constitutions of the first embodiment except for a composition of a coat layer.

In the present embodiment, "a urethane-based resin comprised of a structural unit derived from polybutadiene having a hydroxyl group on the terminal and a structural unit derived from diphenylmethane diisocyanate" is used as "a urethane-based resin comprised of a structural unit derived from compound having hydroxyl group and a structural unit derived from aromatic diisocyanate".

[Method of Producing Plastic Polarized Lens]

Hereinafter, the method of producing a plastic polarized lens will be described with reference to drawings.

The method of producing a plastic polarized lens of the present embodiment includes the following steps.

(a) A step of forming the coat layers 13a and 13b containing a urethane-based resin comprised of a structural unit derived from polybutadiene having a hydroxyl group on the terminal and a structural unit derived from diphenylmethane diisocyanate, over both surfaces of the polarized film 12 containing thermoplastic polyester (b) A step of fixing the coat layer-attached polarized film 12 into a lens casting mold, in a state separated from an inner surface of the mold (c) A step of injecting a monomer mixture into a gap between both surfaces of the coat layer-attached polarized film 12 and the inner surface of the mold (d) A step of stacking the substrate layers 14a and 14b containing a thiourethane-based resin over both surfaces of the coat layer-attached polarized film 12 by polymerizing and curing the monomer mixture.

Hereinafter, the respective steps will be described in order.

(Step (a))

The step (a) is carried out in the same manner as the first embodiment except for following conditions.

In the present embodiment, before the step of shaping the polarized film 12 under a condition of a temperature equal to or higher than a glass transition temperature of thermoplastic polyester +5° C. and equal to or lower than a melting point of thermoplastic polyester, heating treatment may be performed on the polarized film. The conditions of the heating treatment are selected appropriately.

In the present embodiment, when urethane coating is performed on the polarized film 12, a solvent-free urethane-based coating agent may be coated as is. However, generally, it is preferable to coat a coating solution prepared by dissolving or dispersing the coating agent in an appropriate solvent selected.

The solvent can be used one described in the first embodiment.

The concentration of the above coating liquid expressed in terms of a urethane-based resin is 0.1 wt % to 50 wt %, preferably 0.3 wt % to 50 wt %, and even more preferably 0.5 wt % to 30 wt %. If the concentration exceeds 50 wt %, stability of the coating liquid over time becomes poor, the presence of a coating layer becomes noticeable since the amount of a urethane resin coated increases and the coating layer becomes too thick, and the adhesion deteriorates due to peeling caused inside the coating layer, in some cases. Inversely, if the concentration is lower than 0.1 wt %, the effect of improving adhesion between the film and the urethane resin as a substrate is not obtained sufficiently in some cases.

The thickness of the coating layer is 0.0001 μm to 30 μm, preferably 0.0005 μm to 10 μm, and more preferably 0.0005 μm to 1 μm.

The urethane-based resin used for the coating treatment is a polymer comprised of a structural unit derived from polybutadiene having a hydroxyl group on the terminal and a structural unit derived from diphenylmethane diisocyanate.

The "structural unit derived from diphenylmethane diisocyanate" may include a structural unit derived from modified diphenylmethane diisocyanate. Examples of the modified diphenylmethane diisocyanate include urethane-modified diphenylmethane diisocyanate, carbodiimide-modified diphenylmethane diisocyanate, and the like. Among these, urethane-modified diphenylmethane diisocyanate is preferable.

The urethane-modified diphenylmethane diisocyanate refers to a reaction product of a diphenylmethane diisocyanate and an alcohol having two or more hydroxyl groups. Examples of the alcohol having two or more hydroxyl groups include ethylene glycol, diethylene glycol, triethylene glycol, and the like, and among these, alcohols including diethylene glycol are preferable. A proportion of the modified diphenylmethane diisocyanate included in the structural unit derived from diphenylmethane diisocyanate is less than 30%, preferably less than 20%, and more preferably less than 10%.

The polybutadiene having a hydroxyl group on the terminal is a polymer having a structural unit derived from polybutadiene which has one or more hydroxyl groups on the molecular terminal thereof. The number of hydroxyl group is preferably 2 or greater and more preferably 2. The polybutadiene is a polymer of 1,3-butadiene, and may include 1,2-conjugate or 1,4-conjugate in any proportion. The proportion of the 1,4-conjugate is preferably 50% or higher, more preferably 70% or higher, and even more preferably 80% or higher.

The coating liquid may further contain a silane coupling agent.

(Steps (b) to (d))

In the present embodiment, steps (b) to (d) can be carried out in the same manner as the first embodiment.

The method of producing a plastic polarized lens of the present invention also employs an embodiment including the following steps.

(a) A step of forming a coat layer containing a urethane-based resin comprised of a structural unit derived from polybutadiene having a hydroxyl group on the terminal and a structural unit derived from diphenylmethane diisocyanate, over one surface of a polarized film containing thermoplastic polyester (b) A step of fixing the coat layer-attached polarized film into a lens casting mold, in a state separated from an inner surface of the mold (c) A step of injecting a monomer mixture into a gap between the coat layer of the coat layer-attached polarized film and the inner surface of the mold (d) A step of stacking a substrate layer containing a thiourethane-based resin over the coat layer of the coat layer-attached polarized film by polymerizing and curing the monomer mixture.

(a) A step of forming a coat layer containing a urethane-based resin comprised of a structural unit derived from polybutadiene having a hydroxyl group on the terminal and a structural unit derived from diphenylmethane diisocyanate, over one surface of a polarized film containing thermoplastic polyester (b) A step of fixing the coat layer-attached polarized film into a lens casting mold, in a state separated from an inner surface of the mold (c) A step of injecting a monomer mixture into a gap between the coat layer of the coat layer-attached polarized film and the inner surface of the mold and a gap between the polarized film and the inner surface of the mold (d) A step of stacking a substrate layer containing a thiourethane-based resin over both surfaces of the coat layer-attached polarized film by polymerizing and curing the monomer mixture Moreover, in the present embodiment, after the coat layer-attached polarized film is formed, a substrate film containing a thiourethane-based resin that is prepared in advance is stacked over the surface of the coat layer, whereby a plastic polarized lens can be produced.

EXAMPLES

Hereinafter, the present invention will be described in more detail based on examples, but the present invention is not limited thereto.

First Examples

Example A1

A polarized film [glass transition temperature 70.7° C.] (thickness 140 µm) made of polyethylene terephthalate was preheated for 15 minutes in an oven at 140° C. and then shaped into a curved shape of 6 C (curve) by heat press at a shaping temperature of 160° C. The polarized film was cut according to the size of a mold, and then the front and back surfaces of the polarized film were irradiated with plasma for 20 seconds by using a plasma irradiation surface modifying apparatus (PS-601SW model: manufactured by WEDGE co., ltd.), followed by washing with methanol and then air drying, thereby preparing a polarized film. Both surfaces of this polarized film made of polyethylene terephthalate were coated with Foundation #123LLR-2 coating agent (SOTECH Corporation) and dried at about 50° C. to 60° C. This film was inserted into a mold (front surface 6 C/back surface 6 C glass mold set, a central thickness 12 mm) for molding a polarized lens. Subsequently, 44.3 parts by weight of m-xylylene diisocyanate, 55.7 parts by weight of a mixture of 1,1,3,3-tetrakis(mercaptomethylthio)propane and 4,6-bis(mercaptomethylthio)-1,3-dithiacyclohexane, 0.02 parts by weight of dibutyl tin dichloride as a curing accelerator, 0.12 parts by weight of Zelec UN (registered trademark, manufactured by Stepan Co., Ltd.) as a release agent, and 0.05 parts by weight of Seesorb 709 (manufactured by SHIPRO KASEI KAISHA, LTD.) as an ultraviolet absorber were stirred and dissolved, and then degassing treatment was performed on the mixture under reduced pressure. Immediately after being prepared, the resultant was provided as a monomer mixture to be injected. The monomer mixture to be injected was injected into the mold for molding a polarized lens that was prepared as above, and the temperature thereof was raised to 100° C. from 25° C. over 16 hours in an oven and then kept at 100° C. for 10 hours. After being slowly cooled, the lens casting mold was taken out of the oven. The lens was released from the lens casting mold, followed by annealing for 2 hours at 115° C., thereby obtaining a polarized lens having a shape of semi-finished lens. Subsequently, the back surface of the lens was cut and polished, thereby obtaining a lens having a 6 C shape.

The obtained 5 lenses having a 6 C shape were subjected to a lens edging process by using a lens edger (ALE-100DX) manufactured by TOPCON CORPORATION so as to be lenses having a width of 49 mm and a height of 28 mm, and then evaluated in terms of the adhesion between the polarized film made of polyethylene terephthalate and the thiourethane resin. As a result, in all of the 5 lenses, peeling was not caused, and this showed excellent adhesion.

Moreover, the composition of the Foundation #123LLR-2 was analyzed to be as below.

Isocyanate component: tolylene diisocyanate
Polyol component: trimethylolpropane and ethanol
Compositional ratio (molar ratio): tolylene diisocyanate//trimethylolpropane/ethanol=1.0//0.18/0.11,
3-(trimethoxysilyl)propyl methacrylate in a small content (about 0.25%)
Solvent: ethyl acetate (EA), butyl acetate (BA), EA/BA=45/55
Solid content: 32%

Comparative Example A1

A finished lens having a 6 C shape was obtained in the same manner as in Example A1, except that both sides of the polarized film made of polyethylene terephthalate were not coated with anything. The obtained lens was subjected to the lens edging process and evaluated in terms of the adhesion between the polarized film made of polyethylene terephthalate and the thiourethane resin as a substrate. As a result, in all of five lenses, peeling of the polarized film made of polyethylene terephthalate was caused.

Comparative Example A2

A finished lens having a 6 C shape was obtained in the same manner as in Example A1, except that SANPRENE IB-422 (polyester-based polyurethane coating agent manufactured by Sanyo Chemical Industries, Ltd.) was used for both sides of the polarized film made of polyethylene terephthalate. The obtained lens was subjected to the lens edging process and evaluated in terms of the adhesion between the polarized film made of polyethylene terephthalate and the thiourethane resin as a substrate. As a result, in 3 lenses among 5 lenses, peeling of the polarized film made of polyethylene terephthalate was caused. The evaluation results are summarized in Table-1.

Moreover, the composition of the SANPRENE IB-422 was analyzed to be as below.

Isocyanate component: isophorone diisocyanate

Polyester component: polyester polyol containing adipic acid, 1,4-butanediol, and 3-methyl-1,5-pentanediol as components.

Compositional ratio (molar ratio): isophorone diisocyanate//polyester polyol=1.0//4.3

Solvent: methyl ethyl ketone (MEK), isopropyl alcohol (IPA), MEK/IPA=60/40

Solid content: 30%

Comparative Example A3

A finished lens having a 6 C shape was obtained in the same manner as in Example A1, except that SK Dyne 2094 (acrylic coating agent manufactured by Soken Chemical & Engineering Co., Ltd.) was used for both sides of the polarized film made of polyethylene terephthalate. The obtained lens was subjected to the lens edging process and evaluated in terms of the adhesion between the polarized film made of polyethylene terephthalate and the thiourethane resin as a substrate. As a result, in 4 lenses among 5 lenses, peeling of the polarized film made of polyethylene terephthalate was caused. The evaluation results are summarized in Table-1.

Comparative Example A4

A finished lens having a 6 C shape was obtained in the same manner as in Example A1, except that SHC900 (silicon-based coating agent manufactured by Momentive Performance Materials Inc.) was used for both sides of the polarized film made of polyethylene terephthalate. The obtained lens was subjected to the lens edging process and evaluated in terms of the adhesion between the polarized film made of polyethylene terephthalate and the thiourethane resin as a substrate. As a result, in all 5 lenses, peeling of the polarized film made of polyethylene terephthalate was caused. The evaluation results are summarized in Table-1.

Comparative Example A5

A finished lens having a 6 C shape was obtained in the same manner as in Example A1, except that STYCAST1266J (epoxy-based coating agent manufactured by Henkel AG & CO.) was used for both sides of the polarized film made of polyethylene terephthalate. The obtained lens was subjected to the lens edging process and evaluated in terms of the adhesion between the polarized film made of polyethylene terephthalate and the thiourethane resin as a substrate. As a result, in all 5 lenses, peeling of the polarized film made of polyethylene terephthalate was caused. The evaluation results are summarized in Table-1.

TABLE 1

| Example and Comparative example | | Name of coating agent | Component of coating agent | Evaluation of adhesion by lens edging process |
|---|---|---|---|---|
| Example | A 1 | Foundation #123LLR-2 | Polyurethane-based component | ○ |
| Comparative example | A 1 | None | None | X |
| | A 2 | SANPRENE IB-422 | Polyester-based polyurethane | X |
| | A 3 | SK Dyne 2094 | Acrylic coating agent | X |
| | A 4 | SHC900 | Silicon-based coating agent | X |
| | A 5 | STYCAST1266J | Epoxy-based coating agent | X |

TABLE 1-continued

* Adhesion evaluation
○: no peeling in all 5 lenses
X: peeling was caused in one or more lenses among 5 lenses.

Second Examples

Example B1

A polarized film (thickness 140 μm) made of polyethylene terephthalate was shaped into a curved shape of 6 C (curve) by heat press at a shaping temperature of 160° C. The polarized film was cut according to the size of a mold, and then the front and back surfaces of the polarized film were irradiated with plasma for 20 seconds by using a plasma irradiation surface modifying apparatus (PS-601SW model: manufactured by WEDGE co., ltd.), followed by washing with methanol and then air drying.

In order to prepare a coat liquid, 7.69 parts by weight of Assist 7M (manufactured by SOTECH Corporation) as a main agent and 2.31 parts by weight of a curing agent were weighed and taken, and diluted with a toluene solvent, such that the 1.0 part by weight of the main agent and curing agent in total yielded a concentration of 0.5% by weight. Both surfaces of the polarized film made of polyethylene terephthalate treated as above were coated with the prepared Assist 7M coating agent at a concentration of 0.5% by weight by dip coating and dried at about 50° C. to 60° C. This film was inserted into a mold (front surface 6 C/back surface 6 C glass mold set, a central thickness 12 mm) for molding a lens.

Subsequently, 44.3 parts by weight of m-xylylene diisocyanate, 55.7 parts by weight of a mixture of 1,1,3,3-tetrakis (mercaptomethylthio)propane and 4,6-bis(mercaptomethylthio)-1,3-dithiacyclohexane, 0.02 parts by weight of dibutyl tin dichloride as a curing accelerator, 0.12 parts by weight of Zelec UN (registered trademark, manufactured by Stepan Co., Ltd.) as a release agent, and 0.05 parts by weight of Seesorb 709 (manufactured by SHIPRO KASEI KAISHA, LTD.) as an ultraviolet absorber were stirred and dissolved, and then degassing treatment was performed on the mixture under reduced pressure, thereby preparing a monomer mixture to be injected.

The monomer mixture to be injected was injected into the mold for molding a lens in which the polarized film was disposed, and the temperature thereof was raised to 100° C. from 25° C. over 16 hours in an oven and then kept at 100° C. for 10 hours. After being slowly cooled, the mold for casting a lens was taken out of the oven. The lens was released from the mold for casting a lens, followed by annealing for 2 hours at 115° C., thereby obtaining a polarized lens blank. Subsequently, the back surface of the lens was cut and polished, thereby obtaining a lens of S: −2.50 D. The obtained lens was excellent lens not showing cloudiness. The obtained 5 lenses of S: −2.50 D were subjected to a lens edging process by using a lens edger (ALE-100DX) manufactured by TOPCON CORPORATION so as to be matched with a frame of eyeglasses, and then evaluated in terms of the adhesion between the polarized film and the substrate (thiourethane resin). As a result, in all of the 5 lenses, peeling was not caused, and this showed excellent adhesion. The evaluation results are summarized in Table-2.

Moreover, the composition of Assist 7M was analyzed to be as below.

Curing agent component: diphenylmethane diisocyanate partially modified with urethane
Main agent component: polybutadiene having a hydroxyl group on the terminal Example B2

A polarized lens blank showing no cloudiness was obtained in the same manner as in Example B1, except that the concentration of Assist 7M coating agent diluted with toluene was adjusted to 1.5% by weight. The obtained lens was subjected to lens edging process and evaluated in terms of the adhesion between the polarized film and the substrate. As a result, in all 5 lenses, peeling was not caused, which showed excellent adhesion. The evaluation results are summarized in Table-2.

Comparative Example B1

A finished lens of S: −2.50 D was obtained in the same manner as in Example B1, except that both sides of the polarized film made of polyethylene terephthalate were not coated with anything. The obtained lens was subjected to the lens edging process and evaluated in terms of the adhesion between the polarized film made of polyethylene terephthalate and the thiourethane resin as a substrate. As a result, in all of 5 lenses, peeling of the polarized film made of polyethylene terephthalate was caused. The evaluation results are summarized in Table-2.

Comparative Example B2

A finished lens of S: −2.50 D was obtained in the same manner as in Example B1, except that SANPRENE IB-422 (polyester-based polyurethane coating agent manufactured by Sanyo Chemical Industries, Ltd.) was used for both sides of the polarized film made of polyethylene terephthalate. The obtained lens was subjected to the lens edging process and evaluated in terms of the adhesion between the polarized film made of polyethylene terephthalate and the thiourethane resin as a substrate. As a result, in 3 lenses among 5 lenses, peeling of the polarized film made of polyethylene terephthalate was caused. The evaluation results are summarized in Table-2.

Moreover, the composition of the SANPRENE IB-422 was analyzed to be as below.

Isocyanate component: isophorone diisocyanate
Polyester component: polyester polyol containing adipic acid, 1,4-butanediol, and 3-methyl-1,5-pentanediol as components.
Compositional ratio (molar ratio): isophorone diisocyanate//polyester polyol=1.0//4.3
Solvent: methyl ethyl ketone (MEK), isopropyl alcohol (IPA), MEK/IPA=60/40
Solid content: 30%

Comparative Example B3

A finished lens of S: −2.50 D was obtained in the same manner as in Example B1, except that SK Dyne 2094 (acrylic coating agent manufactured by Soken Chemical & Engineering Co., Ltd.) was used for both sides of the polarized film made of polyethylene terephthalate. The obtained lens was subjected to the lens edging process and evaluated in terms of the adhesion between the polarized film made of polyethylene terephthalate and the thiourethane resin as a substrate. As a result, in 4 lenses among 5 lenses, peeling of the polarized film made of polyethylene terephthalate was caused. The evaluation results are summarized in Table-2.

Comparative Example B4

A finished lens of S: −2.50 D was obtained in the same manner as in Example B1, except that SHC900 (silicon-based coating agent manufactured by Momentive Performance Materials Inc.) was used for both sides of the polarized film made of polyethylene terephthalate. The obtained lens was subjected to the lens edging process and evaluated in terms of the adhesion between the polarized film made of polyethylene terephthalate and the thiourethane resin as a substrate. As a result, in all 5 lenses, peeling of the polarized film made of polyethylene terephthalate was caused. The evaluation results are summarized in Table-2.

Comparative Example B5

A finished lens of S: −2.50 D was obtained in the same manner as in Example B1, except that STYCAST1266J (epoxy-based coating agent manufactured by Henkel AG & CO.) was used for both sides of the polarized film made of polyethylene terephthalate. The obtained lens was subjected to the lens edging process and evaluated in terms of the adhesion between the polarized film made of polyethylene terephthalate and the thiourethane resin as a substrate. As a result, in all 5 lenses, peeling of the polarized film made of polyethylene terephthalate was caused. The evaluation results are summarized in Table-2.

TABLE 2

| Example and Comparative example | | Name of coating agent | Component of coating agent | Evaluation of adhesion by lens edging process |
|---|---|---|---|---|
| Example | B1 | Assist 7M Concentration 0.5% by weight | Polyurethane-based component | ○ |
| | B2 | Assist 7M Concentration 1.5% by weight | Polyurethane-based component | ○ |
| Comparative example | B1 | None | None | X |
| | B2 | SANPRENE IB-422 | Polyester-based polyurethane | X |
| | B3 | SK Dyne 2094 | Acrylic coating agent | X |
| | B4 | SHC900 | Silicon-based coating agent | X |
| | B5 | STYCAST1266J | Epoxy-based coating agent | X |

* Adhesion evaluation
○: no peeling in all 5 lenses
X: peeling was caused in one or more lenses among 5 lenses.

The present invention includes following embodiments.
[a1] A plastic polarized lens, comprising:
a polarized film containing thermoplastic polyester,
a coat layer containing a urethane-based resin comprised of a structural unit derived from trimethylolpropane and a structural unit derived from tolylene diisocyanate, which is formed over at least one surface of the polarized film and a substrate layer containing a thiourethane-based resin, which is formed over at least the coat layer of the coat layer-attached polarized film.

[a2] The plastic polarized lens according to [a1], wherein the coat layer further contains a silane coupling agent.

[a3] The plastic polarized lens according to [a1] or [a2], wherein the coat layer and the substrate layer are stacked in order over both surfaces of the polarized film.

[a4] The plastic polarized lens according to any one of [a1] to [a3], wherein the thiourethane-based resin is obtained by reacting at least one of isocyanate compound(s) (A) selected from a group consisting of a polyisocyanate compound, an isocyanate compound having an isothiocyanate group, and a polyisothiocyanate with at least one of active hydrogen compound(s) (B) selected from a group consisting of a thiol compound having a hydroxyl group and a polythiol compound.

[a5] The plastic polarized lens according to any one of [a1] to [a4], wherein the polarized film is shaped under a condition of a temperature T represented by the following formula, glass transition temperature of thermoplastic polyester+5° C.≤T≤melting point of thermoplastic polyester. (Formula)

[a6] The plastic polarized lens according to any one of [a1] to [a5], wherein the polarized film is a polyethylene terephthalate film.

[a7] The plastic polarized lens according to any one of [a4] to [a6], wherein the isocyanate compound(s) (A) is at least one of diisocyanate compounds selected from a group consisting of m-xylylene diisocyanate, 2,4-tolylene diisocyanate, 2,6-tolylene diisocyanate, 4,4'-diphenylmethane diisocyanate, 2,5-bis(isocyanatomethyl)-bicyclo[2.2.1]-heptane, 2,6-bis(isocyanatomethyl)-bicyclo[2.2.1]-heptane, bis(4-isocyanatocyclohexyl)methane, 1,3-bis(isocyanatomethyl)cyclohexane, 1,4-bis(isocyanatomethyl)cyclohexane, and hexamethylene diisocyanate, and the active hydrogen compound(s) (B) is at least one of polythiol compounds selected from a group consisting of pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-dimercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[a8] The plastic polarized lens according to any one of [a1] to [a7], wherein a refractive index at e-line of the thiourethane-based resin is in a range of 1.50 to 1.70.

[a9] A method of producing a plastic polarized lens, comprising:

forming a coat layer containing a urethane-based resin comprised of a structural unit derived from trimethylolpropane and a structural unit derived from tolylene diisocyanate, over at least one surface of a polarized film containing thermoplastic polyester;

fixing the coat layer-attached polarized film into a lens casting mold, in a state separated from an inner surface of the mold;

injecting a monomer mixture into a gap between at least the coat layer of the coat layer-attached polarized film and the inner surface of the mold; and stacking a substrate layer containing a thiourethane-based resin over at least the coat layer of the coat layer-attached polarized film by polymerizing and curing the monomer mixture.

[a10] The method of producing a plastic polarized lens according to [a9], wherein the coat layer further contains a silane coupling agent.

[a11] The method of producing a plastic polarized lens according to [a9] or [a10], wherein the forming a coat layer includes forming the coat layer over both surfaces of the polarized film.

[a12] The method of producing a plastic polarized lens according to any one of [a9] to [a11], further comprising:

shaping the polarized film under a condition of a temperature equal to or higher than a glass transition temperature of thermoplastic polyester +5° C. and equal to or lower than a melting point of thermoplastic polyester, before the forming a coat layer.

[a13] The method of producing a plastic polarized lens according to any one of [a9] to [a11], further comprising:

a step of shaping the polarized film under a condition of a temperature equal to or higher than a glass transition temperature of thermoplastic polyester +5° C. and equal to or lower than a melting point of thermoplastic polyester, after the forming a coat layer.

[a14] The method of producing a plastic polarized lens according to any one of [a9] to [a13], wherein, in the injecting a monomer mixture, a viscosity at 20° C. of the monomer mixture is not more than 200 mPa·s.

[a15] A urethane-based resin-coated polarized film comprising:

a polarized film containing thermoplastic polyester and a coat layer containing a urethane-based resin comprised of a structural unit derived from trimethylolpropane and a structural unit derived from tolylene diisocyanate, which is formed over at least one surface of the polarized film.

[a16] The urethane-based resin-coated polarized film according to [a15], wherein the coat layer further contains a silane coupling agent.

[a17] A method of producing a urethane-based resin-coated polarized film, comprising:

forming a coat layer containing a urethane-based resin comprised of a structural unit derived from trimethylolpropane and a structural unit derived from tolylene diisocyanate, over at least one surface of a polarized film containing thermoplastic polyester.

[a18] The method of producing a urethane-based resin-coated polarized film according to [a17], wherein the coat layer further contains a silane coupling agent.

[b1] A plastic polarized lens, comprising:

a polarized film containing thermoplastic polyester, a coat layer containing a urethane-based resin comprised of a structural unit derived from polybutadiene having a hydroxyl group on the terminal and a structural unit derived from diphenylmethane diisocyanate, which is formed over at least one surface of the polarized film and a substrate layer containing a thiourethane-based resin, which is formed over at least the coat layer of the coat layer-attached polarized film.

[b2] The plastic polarized lens according to [b1],
wherein the coat layer and the substrate layer are stacked in order over both surfaces of the polarized film.

[b3] The plastic polarized lens according to [b1] or [b2],
wherein the thiourethane-based resin is obtained by reacting at least one kind of isocyanate compound(s) (A) selected from a group consisting of a polyisocyanate compound, an isocyanate compound having an isothiocyanate group, and a polyisothiocyanate with at least one kind of active hydrogen compound(s) (B) selected from a group consisting of a thiol compound having a hydroxy group and a polythiol compound.

[b4] The plastic polarized lens according to any one of [b1] to [b3],
wherein the polarized film is shaped under a condition of a temperature T represented by the following formula, $$\text{glass transition temperature of thermoplastic polyester} + 5°C. \leq T \leq \text{melting point of thermoplastic polyester.} \quad \text{(Formula)}$$

[b5] The plastic polarized lens according to any one of [b1] to [b4],
wherein the polarized film is a polyethylene terephthalate film.

[b6] The plastic polarized lens according to any one of [b3] to [b5],
wherein the isocyanate compound(s) (A) is at least one of diisocyanate compounds selected from a group consisting of m-xylylene diisocyanate, 2,4-tolylene diisocyanate, 2,6-tolylene diisocyanate, 4,4'-diphenylmethane diisocyanate, 2,5-bis(isocyanatomethyl)-bicyclo[2.2.1]-heptane, 2,6-bis(isocyanatomethyl)-bicyclo[2.2.1]-heptane, bis(4-isocyanatocyclohexyl)methane, 1,3-bis(isocyanatomethyl)cyclohexane, 1,4-bis(isocyanatomethyl)cyclohexane, and hexamethylene diisocyanate, and
the active hydrogen compound(s) (B) is at least one of polythiol compounds selected from a group consisting of pentaerythritol tetrakis(3-mercaptopropionate), 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, 2,5-dimercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[b7] A method of producing a plastic polarized lens, comprising:
forming a coat layer containing a urethane-based resin comprised of a structural unit derived from polybutadiene having a hydroxyl group on the terminal and a structural unit derived from diphenylmethane diisocyanate, over at least one surface of a polarized film containing thermoplastic polyester;
fixing the coat layer-attached polarized film into a mold for casting a lens in a state separated from an inner surface of the mold;
injecting a monomer mixture into a gap between at least the coat layer of the coat layer-attached polarized film and the inner surface of the mold; and
stacking a substrate layer containing a thiourethane-based resin over at least the coat layer of the coat layer-attached polarized film by polymerizing and curing the monomer mixture.

[b8] The method of producing a plastic polarized lens according to [b7],
wherein the forming a coat layer includes forming the coat layer over both surfaces of the polarized film.

[b9] The method of producing a plastic polarized lens according to [b8],
wherein, before forming a coat layer, shaping the polarized film under a condition of a temperature T represented by the following formula, $$\text{glass transition temperature of thermoplastic polyester} + 5°C. \leq T \leq \text{melting point of thermoplastic polyester.} \quad \text{(Formula)}$$

[b10] A urethane-based resin-coated polarized film comprising:
a polarized film containing thermoplastic polyester; and
a coat layer containing a urethane-based resin comprised of a structural unit derived from polybutadiene having a hydroxyl group on the terminal and a structural unit derived from diphenylmethane diisocyanate, which is formed over at least one surface of the polarized film.

[b11] A method of producing a urethane-based resin-coated polarized film, comprising:
forming a coat layer containing a urethane-based resin comprised of a structural unit derived from polybutadiene having a hydroxyl group on the terminal and a structural unit derived from diphenylmethane diisocyanate, over at least one surface of a polarized film containing thermoplastic polyester.

What is claimed is:

1. A plastic polarized lens, comprising:
a polarized film containing thermoplastic polyester,
a coat layer containing a urethane-based resin comprised of a structural unit derived from polybutadiene having a hydroxyl group on a terminal and a structural unit derived from diphenylmethane diisocyanate, which is formed over at least one surface of the polarized film and
a substrate layer containing a thiourethane-based resin, which is formed over at least the coat layer,
wherein the thiourethane-based resin is prepared by reacting m-xylylene diisocyanate with a mixture of 1,1,3,3-tetrakis(mercaptomethylthio)propane and 4,6-bis(mercaptomethylthio)-1,3-dithiane.

2. The plastic polarized lens according to claim 1,
wherein the coat layer further contains a silane coupling agent.

3. The plastic polarized lens according to claim 1,
wherein the coat layer and the substrate layer are stacked in order over both surfaces of the polarized film.

4. The plastic polarized lens according to claim 1,
wherein the polarized film is shaped under a condition of a temperature T represented by the following formula, $$\text{glass transition temperature of thermoplastic polyester} + 5°C. \leq T \leq \text{melting point of thermoplastic polyester.} \quad \text{(Formula)}$$

5. The plastic polarized lens according to claim 1,
wherein the polarized film is a polyethylene terephthalate film.

6. The plastic polarized lens according to claim 1,
wherein a refractive index at e-line of the thiourethane-based resin is in a range of 1.50 to 1.70.

7. A method of producing a plastic polarized lens, comprising:
forming a coat layer containing a urethane-based resin comprised of a structural unit derived from polybutadiene having a hydroxyl group on a terminal and a structural unit derived from diphenylmethane diisocyanate, over at least one surface of a polarized film containing thermoplastic polyester;

fixing the polarized film into a lens casting mold, in a state separated from an inner surface of the mold;

injecting a monomer mixture into a gap between at least the coat layer and the inner surface of the mold; and stacking a substrate layer containing a thiourethane-based resin over at least the coat layer by polymerizing and curing the monomer mixture, wherein the thiourethane-based resin is prepared by reacting m-xylylene diisocyanate with a mixture of 1,1,3,3-tetrakis(mercaptomethylthio)propane and 4,6-bis(mercaptomethylthio)-1,3-dithiane.

8. The method of producing a plastic polarized lens according to claim 7, wherein the coat layer further contains a silane coupling agent.

9. The method of producing a plastic polarized lens according to claim 7, wherein the forming a coat layer includes forming the coat layer over both surfaces of the polarized film.

10. The method of producing a plastic polarized lens according to claim 7, further comprising:

shaping the polarized film under a condition of a temperature equal to or higher than a glass transition temperature of thermoplastic polyester +5° C. and equal to or lower than a melting point of thermoplastic polyester, before the forming a coat layer.

11. The method of producing a plastic polarized lens according to claim 7, further comprising:

a step of shaping the polarized film under a condition of a temperature equal to or higher than a glass transition temperature of thermoplastic polyester +5° C. and equal to or lower than a melting point of thermoplastic polyester, after the forming a coat layer.

12. The method of producing a plastic polarized lens according to claim 7, wherein, in the injecting a monomer mixture, a viscosity at 20° C. of the monomer mixture is not more than 200 mPa·s.

13. A urethane-based resin-coated polarized film comprising:

a polarized film containing thermoplastic polyester and a coat layer containing a urethane-based resin comprised of a structural unit derived from polybutadiene having a hydroxyl group on a terminal and a structural unit derived from diphenylmethane diisocyanate, which is formed over at least one surface of the polarized film.

14. The urethane-based resin-coated polarized film according to claim 13, wherein the coat layer further contains a silane coupling agent.

15. A method of producing a urethane-based resin-coated polarized film, comprising:

forming a coat layer containing a urethane-based resin comprised of a structural unit derived from polybutadiene having a hydroxyl group on a terminal and a structural unit derived from diphenylmethane diisocyanate, over at least one surface of a polarized film containing thermoplastic polyester.

16. The method of producing a urethane-based resin-coated polarized film according to claim 15, wherein the coat layer further contains a silane coupling agent.

* * * * *